3,767,663
BIS OXAZOLES AS BRIGHTENERS FOR
FIBERS AND PLASTICS
Henry Xavier Kaempfen, Hillsboro Township, Somerset County, N.J., assignor to American Cyanamid Company, Stamford, Conn.
No Drawing. Original application May 4, 1970, Ser. No. 34,516, now Patent No. 3,653,943. Divided and this application Sept. 15, 1971, Ser. No. 180,924
Int. Cl. C07d 85/00
U.S. Cl. 260—307 D
2 Claims

ABSTRACT OF THE DISCLOSURE

Natural and synthetic fibers and plastics are brightened by applying thereto 2,2'-bisnaphthoxazolyl and 2-(benzoxazol-2-yl)naphthoxazole compounds. Fibers brightened include cellulose, polyamide and polyester. Plastics brightened include polyvinyl chloride, polyethylene and polyester.

This is a division of application Ser. No. 34,516, filed May 4, 1970, now U.S. Pat. No. 3,653,943.

This invention is directed to improvements in the brightening of natural and synthetic fibers and fabrics and molded and extruded plastics by applying thereto the hereinafter defined bis oxazoles in brightening amounts. The invention includes brightening methods wherein one or more compounds of this class are applied to textiles or plastics of the types hereinafter described, the brightened products so obtained, and certain new bis oxazoles as novel brightening compositions of matter.

It is well known to apply brighteners to textile fibers and fabrics and to light-colored plastics in brightening amounts, which are usually in the order of about 0.05 to 5 milligrams of brightener per gram of textile or plastic material. Stilbene derivatives such as bis(triazinylamino)stilbene-2,2'-disulfonates are among the most widely used compounds of this class although bis oxazoles having a phenylene or a vinylene bivalent group linking the two oxazole radicals in their 2,2'-positions are known to be optical brightening agents. However bis oxazoles, which have a covalent link in the 2,2'-position instead of a connecting radical and which have at least one naphthoxazole moiety, have not heretofore been known to possess brightening properties.

My present invention is based on the discovery that textiles and plastics of the types hereinafter described can be brightened by incorporating therein a bis oxazole which is a compound having the formula (1) 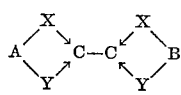

wherein X is one member of the group consisting of oxygen bonded singly to the carbon atom and nitrogen bonded doubly to the same carbon atom and Y is the other member of this group, A is a naphthylene or appropriately substituted naphthylene radical, and B is a naphthylene A or an o-phenylene radical or appropriately substituted radical of same. Each naphthylene or substituted naphthylene radical is attached to X and Y in either the 1,2-d or 2,1-d position.

Where A and B are each the same unsubstituted or nuclear substituted naphthylene radical attached in the same position to X and Y, a symmetrical molecule is obtained. These are the most easily prepared bis-naphthoxazole brighteners, and are therefore preferred for many purposes. Representative compounds of this class are the 2,2'-bisnaphth[1,2-d]oxazolyl of Example 1 and the 2,2'-bis(5-cyanonaphth[1,2-d]oxazolyl) of Example 8.

Where A and B are either different radicals, as where one is a naphthylene and the other a 5-chloronaphthylene or a phenylene radical, or where they are differently attached to X and Y, as in the 2-(naphth[2,1-d]oxazol-2-yl)naphth[1,2-d]oxazole of Example 4, unsymmetrical bis oxazoles are obtained. These are prepared by oxidative ring closure of the corresponding azomethines as will subsequently be further described.

These bis oxazoles have affinity for a variety of textile materials such as cellulosic fibers, polyamides and polyesters as well as plastics such as polyvinyl chloride, polyethylene and polyesters. They have good stability to hypochlorite.

There are three surprising properties of the brighteners of this invention compared to known oxazole brighteners.

First, the shade of fluorescence of compounds of this class is generally much "redder" (that is, appears reddish blue) than might be expected for molecules of this size. This is advantageous since the more common greenish-blue shade of fluorescence is less desirable for commercial uses (i.e. in detergents, etc.).

Second, despite the redness of this shade of fluorescence, as noted above, the compounds of this class generally have strong absorption at wavelengths very near and just within the violet end of the visible portion of the electromagnetic spectrum. This is most unusual since compounds which absorb ultraviolet light at the longer wavelengths from, say, 375 nm.[1] and higher, emit fluorescent light which is very greenish-blue or even yellow, making all such compounds useless as brighteners.

Thirdly, the efficiency of the compounds of this invention as fluorescing agents in daylight (sunlight) is significantly better than the great majority of such materials. This is because (1) the energy distribution of radiation from the sun is such that more energy is available at the longer wavelengths (e.g. 390 nm.) than at the shorter wavelengths (e.g. 350 nm.), and (2) the longer wavelength absorption of the compounds of this invention, as was described in the paragraph above, makes them exceptionally capable of fully exploiting these energy differences. The directly observable result of this efficiency is described in Example 5.

The bis oxazole brighteners of the invention are therefore well suited for incorporation into commercial laundering compositions in quantities adapted to impart a desired degree of whitening, either when used alone or in conjunction with other brighteners, such quantities usually being within the range of about 0.05% to 1.5% based on the weight of the detergents. These may be anionic compounds such as soap, alkylaryl sulfonates and the like, or nonionics such as ethylene oxide condensation products of alkylphenols, higher aliphatic alcohols, hexitol anhydrides and the like, and may include builders such as alkali metal phosphates or polyphosphates.

The symmetrical bisnaphthoxazole brighteners of my invention can be prepared by direct auto-coupling of a naphth[1,2-d] or [2,1-d]oxazole by heating it with a copper salt such as cupric butyrate. This method is described in U.S. Pat. No. 2,148,920. Brighteners of this class are obtained when the naphtho nucleus is unsubstituted or when it carries substituents such as lower alkyl,

[1] Wavelength given in nanometers (nm.).

lower alkoxy, halo, acylamino, carbamoyl, carboalkoxy, carboxyaryl, lower aralkyl or cyano groups.

Representative starting materials are 2-amino-4-(5 or 6)-methyl-1-naphthol,
1-amino-5-(or 6)-ethyl-2-naphthol,
1-amino-5-isopropyl-2-naphthol,
1-amino-6-(or 7)-methoxy-2-naphthol,
2-amino-5-methoxy-1-naphthol,
methyl 6-amino-5-hydroxy-2-naphthoate 4-(or 5)-acetamido-1-amino-2-naphthol,
1-amino-3-benzamido-2-naphthol.

Reduction product of nitrosated 4-phenyl-1-naphthol,
1-amino-6-bromo-2-naphthol,
2-amino-4-bromo-1-naphthol,
1-amino-7-chloro-2-naphthol,
1-amino-3,4-dibromo-2-naphthol,
4-amino-3-hydroxy-1-naphthoic acid,
6-amino-5-hydroxy-1-naphthoic acid,
1-amino-2-naphthol, and
2-amino-1-naphthol.

These and other similar o-aminonaphthols may be converted into the corresponding naphthoxazoles, as by heating with formic acid, from which the symmetrical biscompounds are prepared by heating with copper salts.

The bis oxazoles of this invention can also be prepared by condensation of an o-aminonaphthol or an o-aminophenol with a 2-formyl-naphth[1,2-d] or [2,1-d]oxazole to form the azomethine, followed by oxidative ring closure to form the bis oxazole. Both symmetrical and asymmetrical bis oxazoles may be made by this method. Any of the compounds listed above may be used as starting materials plus o-aminophenols such as 2-amino-4(t or n)-butylphenol,
2-amino-4-(benzyloxy)phenol,
2-amino-5-ethoxyphenol,
2-amino-4,5-(methylenedioxy)phenol methyl 4-amino-3-hydroxybenzoate,
3-amino-4-hydroxybenzamide,
2-amino-3-hydroxybenzamide,
3-amino-N-butyl-4-hydroxybenzamide,
2-amino-4-(or 5)-phenylphenol,
2-amino-α-phenyl-p-cresol,
6-amino-α-phenyl-m-cresol,
3-amino-4-hydroxybenzonitrile,
2-amino-4-chlorophenol,
3-amino-4-hydroxybenzoic acid,
4-amino-3-hydroxybenzoic acid.

All of the above-described bis oxazoles have affinity for cellulosic fibers and for fabrics containing them including cotton, cellulose acetate and the like. They also exhaust well on textile fibers containing polyamides such as the nylons, on polyester fibers such as polyethylene terephthalate, on polyacrylonitrile fibers, and on fabrics composed of or containing these fibers. They may also be used to brighten translucent plastics including polyvinyl chloride and polyolefins such as polyethylene and polypropylene, which may be in the form of extruded fibers or films or shaped or molded into sheets or other forms, preferably in amounts on the order of about 0.005% to 0.1% on the weight of the plastic. They may be applied to the textile fibers and fabrics by conventional padding procedures from aqueous solutions which preferably also contain a nonionic or anionic detergent, followed by rinsing and drying. They are preferably applied to thermoplastic materials such as polyvinyl chloride by mixing on heated rolls.

The invention will be further described and illustrated by the following representative examples to which, however, it is not limited. Wavelength is measured in nanometers, nm.

EXAMPLE 1

Preparation of 2,2'-bisnaphth[1,2-d]oxazolyl

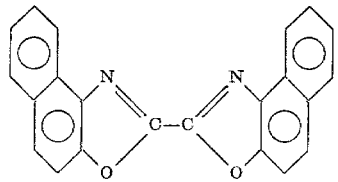

A mixture of 6 g. naphth[1,2-d]oxazole J. prakt. Chem. [2] 73, 438 (1906) and 3 g. cupric butyrate was heated in a metal bath at about 210° C. under nitrogen for 1 hour; 50 ml. of cyclohexane was added to the warm reaction mixture and the mass triturated. The solid was collected, washed with cyclohexane and crystallized from monochlorobenzene. The weight of dull-yellow-green, felted crystals was 1.8 g. (30%), M.P. 313–315° C.

The absorption maximum occur (in 1,2,4-trichlorobenzene) at 358, 371 and 388 nm., while the emission peak occurs at 400, 423 and 447 nm. A sample for analysis was obtained by further crystallization from, first, dimethylformamide, then from monochlorobenzene. Analytically pure material had a melting point of 318–319.5° C. A thin-layer chromatogram on silica in chloroform displayed only one fluorescent spot ($R_f$=0.70).

Theory for $C_{22}H_{12}N_2O_2$ (percent): C, 78.6; H, 3.6; N, 8.3. Found (percent): C, 78.5; H, 3.4; N, 8.2.

EXAMPLE 2

In an alternative method for making the compound of Example 1, 2.1 g. of the azomethine, M.P. ca. 220° C., formed from 2-formyl-naphth[1,2-d]oxazole Ber. 90 2646 (1957) and 1-amino-2-naphthol, was dissolved in 200 ml. acetone at ambient temperature. A solution of 0.6 g. potassium permanganate in 150 ml. acetone was added slowly. When the reaction was complete, the solvent was evaporated and the residue shaken with water. The product was collected, washed, dried and recrystallized from dimethylformamide, yield 1.2 g. (58%) light green crystals, M.P. 313–315° C. Its infrared curve was the same as that of the product of Example 1.

EXAMPLE 3

Preparation of 2,2'-bisnaphth[2,1-d]oxazolyl

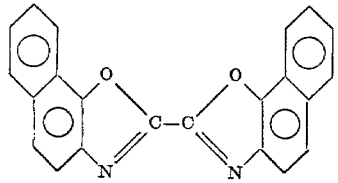

A mixture of 1.4 g. naphth[2,1-d]oxazole (J. prakt. Chem. idem) and 1 g. cupric butyrate was heated in a metal bath at 210–220° C. for 45 min. under nitrogen. The cooled reaction solid was extracted with boiling toluene, and the extract filtered and concentrated. From the cool filtrate was collected 0.7 g. greenish crystals, which were washed with dilute aqueous ammonia solution, dried and recrystallized from benzene. A second crystallization from benzene, with decolorizing charcoal, gave 0.3 g. (22%) sand-colored needles, M.P. 283.5–285° C. The absorption maxima in 1,2,4-trichlorobenzene occur at 318, 326, 365 and 387 nm. with a shoulder at about 355 nm. Its emission maxima are at 396, 417 and 441 nm. in 1,2,4-trichlorobenzene. A thin-layer chromatogram on silica in benzene displayed only one fluorescent spot ($R_f$=0.12). A further crystallization from benzene afforded the analytical sample (M.P. 284.5–285.5° C.).

Theory for $C_{22}H_{12}N_2O_2$ (percent): C, 78.6; H, 3.6; N, 8.3. Found (percent): C, 78.5; H, 3.4; N, 8.2.

EXAMPLE 4

Preparation of 2-(naphth[2,1-d]oxazol-2-yl)naphth[1,2-d]oxazole

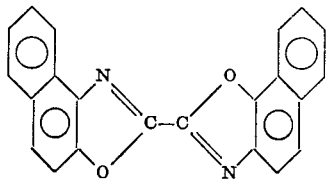

To a solution of 3.05 g. of azomethine, M.P. 204–205° C., formed by the condensation of naphth[2,1-d]oxazolyl-2-carboxaldehyde and 1-amino-2-naphthol in ethanolic acetic acid, in 40 ml. acetone stirred at room temperature was added dropwise over 15 min., a solution of 1 g. potassium permanganate in 50 ml. acetone. After all permanganate had been added, stirring was allowed to continue for 10 minutes longer. The reaction mixture was poured into 600 ml. water, with stirring. The brown precipitate was collected, washed with dilute, aqueous sodium bisulfite and dried. Crystallization of the crude product from n-butanol gave 2.2 g. (73% yld.) of light brown powder. After two further crystallizations from methylcyclohexane, 1.55 g. of light brown powder, M.P. 222–225° C. remained. Recrystallization from nitromethane gave 1.2 g. (40%) of pure product, M.P. 224–226° C. A thin layer chromatogram on silica in benzene showed only one fluorescent spot (bright blue) on irradiation with an ultraviolet lamp; its $R_f$ value was 0.15. The absorption maxima occur at 365 and 386 nm. in 1,2,4-trichlorobenzene with a strong shoulder at about 357 nm. Its emission maxima come at 399, 421 and 443 nm. (same solvent).

Theory for $C_{22}H_{12}N_2O_2$ (percent): C, 78.6; H, 3.6; N, 8.3. Found (percent): C, 78.5; H, 3.4; N, 8.2.

EXAMPLE 5

Method of applying brighteners to cotton, nylon, acetate and polyester in the presence of detergent To 50 ml. 0.5% conc. nonionic or anionic detergent in water, in a Launder-Ometer was added 1.0 ml. 0.05% solution of the compound in dimethylformamide. A wetout 5-gram fabric chosen from 80 x 80 bleached cotton muslin
80 x 80 resin-treated cotton muslin
scoured nylon tricot
scoured acetate tricot
scoured polyester tricot was added. The jar was closed, shaken and run for 25 min. at 130° F. in a Launder-Ometer. The fabric was removed, rinsed with water and dried.

When each of the three compounds of Examples 1, 3 and 4 were thus applied and compared to a standard oxazole brightener, 2-styrylnaphth[1,2-d]oxazole the strength of the brightening effect in northern daylight was double that expected by comparison of their fluorescence with the standard under ultraviolet light.

The compound of Example 4 showed strong affinity for nylon and polyester when, as a nonionic detergent, a condensate of nonylphenol with an average of 9.5 moles of ethylene oxide, was used.

In the above procedure, if sufficient sodium hypochlorite is added to give 2 p.p.m. available chlorine, fabrics to which the compounds of Example 1 and 4 are applied, show no loss of fluorescence. Stability to hypochlorite is an important property for a brightener.

EXAMPLE 6

Brightening of polyvinyl chloride

A steam-heated two-roll Thropp Mill having one roll at 300° F. and the other roll at 275° F. was used for mixing the compound of Example 1 with the plastic. 100 gram polyvinyl chloride powder was placed in the nip and banded. When a workable mass was obtained, 20 mg. 2,2'-bisnaphth[1,2-d]oxazolyl was added. The band was cut at every pass for 50 passes. It was transferred to a molding machine and molded at 300° C. into a sheet of 20 mil thickness.

The molded sheet was much brighter than a blank sheet similarly prepared. When exposed to fluorescent sun lamp, the brightened sheet held up 100 hours before a slight fading occurred. This showed good lightfastness.

When similarly incorporated in polyethylene at lower temperature using rolls at 250° F. and 100° F., respectively and molding at 280° F., a similar brightening effect was obtained.

EXAMPLE 7

Preparation of 5-cyanonaphth[1,2-d]oxazole

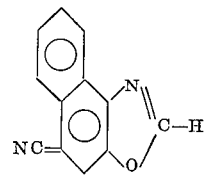

A mixture of 14 g. 1-amino-4-cyano-2-naphthol, prepared according to J. Chem. Soc., 1934, p. 1485, 15 g. anhydrous sodium formate and 50 ml. 98% formic acid was stirred at reflux for 24 hours, and poured with stirring into one liter of cold water. Concentrated ammonium hydroxide was added slowly, with stirring until the dispersion was only slightly acidic. The orange-brown precipitate was collected, washed with water and dried. The crude product was crystallized from trichlorobenzene and yielded 5 g. (38% yld.) of brown granules (M.P. ca. 215° C.). An infrared absorption curve indicated it to be 4-cyano-1-formamido-2-naphthol.

Dehydrative cyclization of the amide could not be effected in polyphosphoric acid at 210° C. However, heating 3 g. of the amide in a vacuum oven at 140° C. at about 100 mm. of Hg pressure for 2 hours, followed by extraction of the cool dark residue with hot cyclohexane, resulted, after concentration of the cyclohexane extract, in the isolation of 0.8 g. (29%) of pure 5-cyanonaphth-[1,2-d]oxazole, M.P. 179–180° C. pale yellow crystals. A sample for analysis was obtained by crystallization from n-heptane, M.P. 179–180° C.

Theory for $C_{12}H_6N_2O$ (percent): C, 74.2; H, 3.1; N, 14.4. Found (percent): C, 74.3; H, 2.8; N, 14.5.

EXAMPLE 8

Preparation of 2,2'-bis(5-cyanonaphth[1,2-d]oxazolyl)

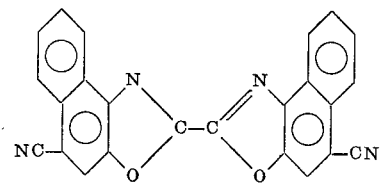

A mixture of 0.7 g. of 5-cyanonaphth[1,2-d]oxazole, prepared in Example 7, and 3 g. copper butyrate was heated in a metal-bath (bath temperature=220–230° C.) under nitrogen for thirty minutes, then allowed to cool.

The dark brown reaction solid was collected, crushed, washed well with dilute ammonium hydroxide, and dried. The crude product was extracted with 300 ml. of boiling 1,2,4-trichlorobenzene. The extract was filtered and concentrated to about 50 ml. The yellow crystalline solid which separated was collected, washed with trichlorobenzene and then with benzene. After drying in a vacuum oven at 110° C. it weighed 0.4 g. (57% yld.). It did not melt below 420° C. Its absorption spectrum in 1,2,4-trichlorobenzene showed maxima at 388 and 412 nm.; its emission peaks in the same solvent occurred at 420, 446 and 473 nm.

Theory for $C_{24}H_{10}N_4O_2$ (percent): C, 74.6; H, 2.6; N, 14.5. Found (percent): C, 74.3; H, 2.5; N, 14.2.

EXAMPLE 9

Preparation of 2-cyanonaphth[1,2-d]oxazol-2-yl) naphth[1,2-d]oxazole

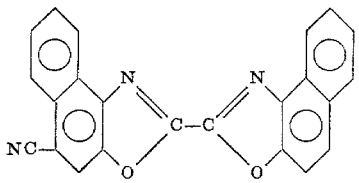

To a dispersion of 1.5 g. of the azomethine, M.P. 245–246° C., formed by condensation of naphth[1,2-d]oxazolyl-2-carboxaldehyde (i.e. 2-formylnaphth[1,2-d]oxazole) with 1-amino-4-cyano-2-naphthol in 250 ml. of acetone, was added 0.45 g. of potassium permanganate, with stirring, at room temperature. After one hour the reaction mixture was poured into a liter of hot water containing a few grams of sodium bisulfite and a few mililiters of acetic acid. The solid was collected by filtration and the crude product washed with water and dried. Crystallization from chlorobenzene afforded 0.75 g. of yellow-orange crystals, melting 331–333° C. A further crystallization from toluene provided pure material, melting 333–334° C. Its absorption maxima were at 373, 383 and 406 nm. in 1,2,4-trichlorobenzene; its emission spectrum (same solvent) had peaks at 418 and 444 nm. with a shoulder at 469 nm.

Theory for $C_{23}H_{11}N_3O_2$ (percent): C, 76.5; H, 3.0; N, 11.6. Found (percent): C, 76.6; H, 218; N, 11.6.

EXAMPLE 10

Preparation of 2-(5-cyanonaphth[1,2-d]oxazol-2-yl) naphth[2,1-d]oxazole

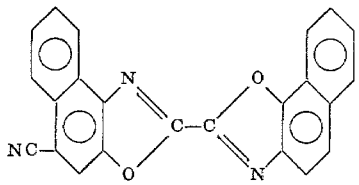

As in Example 9, the azomethine (2.1 g., M.P. about 275° C.) formed by condensation of 2-formyl-(naphth-[2,1-]oxazole and 1-amino-4-cyano-2-naphthol was treated with potassium permanganate (0.6 g.) in 250 ml. of acetone stirred at room temperature. After 1¼ hours the mixture was poured into 1 liter of hot water containing a few grams of sodium bisulfite and a few ml. of acetic acid. The crude product was collected, washed and dried, then crystallized from chlorobenzene. The yield of dull-yellow-brown solid was 1.4 g., melting 303.5–305° C. Recrystallization of this material from toluene afforded pure product, M.P. 305.5–307° C. Its absorption spectrum in 1,2,4-trichlorobenzene had peaks at 382 and 406 nm. with a shoulder at 366 nm.; its emission (same solvent) had peaks at 416 and 440 nm.

Theory for $C_{23}H_{11}N_3O_2$ (percent): C, 76.5; H, 3.0; N, 11.6. Found (percent): C, 76.4; H, 2.9; N, 11.9.

EXAMPLE 11

Preparation of 2-(5,6-dimethylbenzoxazol-2-yl)naphth-[2,1-d]oxazole

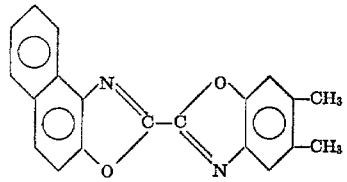

To a dispersion of the azomethine (1.5 g.) M.P. 195–196° C., formed by condensation of 2-formylnapth[2,1-d]oxazole with 2-amino-4,5-dimethylphenol, in acetone (150 ml.) was added, rapidly with stirring, at room temperature, 0.5 g. potassium permanganate in 100 ml. of acetone. After ½ hour, the reaction mixture was poured into 1½ liters of hot water containing 3 g. of sodium bisulfite and 3 ml. of acetic acid. The crude product was collected by filtration, washed with water and dried. It was then crystallized from benzene, yielding 0.95 g. of the brown powder, melting 265–266° C. Further crystallization from methylcyclohexane provided pure product as yellow crystals, melting 265.5–266.5° C. Its absorption maxima (in 1,2,4-trichlorobenzene) came at 316, 328, 355 and 375 nm.; its emission peaks (same solvent) occurred at 394 and 406 nm., with a shoulder at 426 nm.

Theory for $C_{20}H_{14}N_2O_2$ (percent): C, 76.4; H, 4.5; N, 8.9. Found (percent): C, 76.2; H, 4.3; N, 8.9.

EXAMPLE 12

Preparation of 2-(5,6-dimethylbenzoxazol-2-yl)naphth-[1,2-d]oxazole

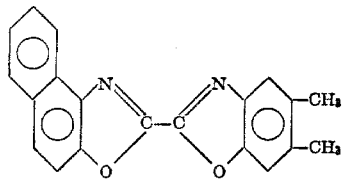

A dispersion of the azomethine (2.4 g.), M.P. 236–237° C., formed by condensation of 2-amino-4,5-dimethylphenol wtih 2-formylnaphth[1,2-d]oxazole in 250 ml. of acetone was treated with 0.8 g. of potassium permanganate at room temperature. After stirring this mixture for ½ hour, it was poured into 1½ liters of hot water containing a few grams of sodium bisulfite and a few mililiters of acetic acid. The crude product was collected, washed with water and dried. Crystallization of the crude product afforded 1.35 g. of lt. tan powder, M.P. 250–251° C. A further crystallization from methylcyclohexane provided the pure material, as lt. yellow crystals, M.P. 249.5–250° C. Its absorption maxima (in 1,2,4-trichlorobenzene) occurred at 315, 346, 358 and 377 nm.; its emission peaks (same solvent) came at 386, 408 and 429 nm.

Theory for $C_{20}H_{14}N_2O_2$ (percent): C, 76.4; H, 4.5; N, 8.9. Found (percent): C, 76.4; H, 4.5; N, 8.6.

What I claim is:

1. As an optical brightener for textiles and plastics a compound of the group consisting of
   2,2'-bisnaphth[1,2-d]oxazolyl,
   2,2'-bisnaphth[2,1-d]oxazolyl,
   2-(naphth[2,1-d]oxazol-2-yl)naphth[1,2-d]oxazolyl, and
   2,2'-bis(5-cyanonaphth[1,2-d]oxazolyl).

2. As an optical brightener for textiles and plastics a compound of the group consisting of
2-(5,6-dimethylbenzoxazol-2-yl)naphth[1,2-d]oxazole, and
2-(5,6-dimethylbenzoxazol-2-yl)naphth[2,1-d]oxazole.

References Cited

UNITED STATES PATENTS

| | | | |
|---|---|---|---|
| 3,575,996 | 4/1971 | Liechti et al. | 252—301.2 WX |
| 3,293,258 | 12/1966 | Siegrist et al. | 252—301.2 WX |
| 3,595,801 | 7/1971 | Rosch et al. | 252—301.2 W |
| 3,609,160 | 9/1971 | Meyer et al. | 252—301.2 WX |
| 2,148,920 | 2/1939 | Zerweck et al. | |
| 3,322,680 | 5/1967 | Hedberg et al. | 117—33.5 TX |
| 3,260,715 | 7/1966 | Saunders | 117—33.5 TX |
| 3,368,543 | 8/1966 | Siegrist et al. | 117—33.5 TX |
| 3,250,780 | 5/1966 | Rai et al. | 260—307 D |

EDWARD G. WHITBY, Primary Examiner

U.S. Cl. X.R.

117—33.5 R, 33.5 T, 138.8 B; 252—301.2